(12) United States Patent
Borkholder (10) Patent No.: US 11,794,827 B2
(45) Date of Patent: Oct. 24, 2023

(54) TRUCK GOOSENECK FIFTH WHEEL TORSION HITCH

(71) Applicant: GEN-Y CREATIONS, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 343 days.

(21) Appl. No.: 17/206,234

(22) Filed: Mar. 19, 2021

(65) Prior Publication Data

US 2021/0339810 A1 Nov. 4, 2021

Related U.S. Application Data

(60) Provisional application No. 63/018,943, filed on May 1, 2020.

(51) Int. Cl.
| | |
|---|---|
| *B62D 53/08* | (2006.01) |
| *B62D 53/06* | (2006.01) |
| *B60D 1/06* | (2006.01) |
| *B60D 1/48* | (2006.01) |
| *B60D 1/01* | (2006.01) |

(52) U.S. Cl.
CPC ....... *B62D 53/0885* (2013.01); *B62D 53/061* (2013.01); *B60D 1/015* (2013.01); *B60D 1/06* (2013.01); *B60D 1/481* (2013.01)

(58) Field of Classification Search
CPC .. B62D 53/0885; B62D 53/061; B60D 1/015; B60D 1/06; B60D 1/481; B60D 1/50
See application file for complete search history.

(56) References Cited

U.S. PATENT DOCUMENTS

| | | | | |
|---|---|---|---|---|
| 6,494,478 | B1 * | 12/2002 | MacKarvich | B60D 1/06 280/483 |
| 8,226,065 | B1 * | 7/2012 | Moeller | F16F 1/545 248/609 |
| 9,505,281 | B1 * | 11/2016 | Borkholder | B60D 1/24 |
| 9,868,327 | B1 * | 1/2018 | Borkholder | B60D 1/248 |
| 2019/0031255 | A1 * | 1/2019 | Borkholder | B60D 1/50 |
| 2019/0225038 | A1 * | 7/2019 | Borkholder | B60D 1/50 |
| 2019/0329614 | A1 * | 10/2019 | Borkholder | B60D 1/248 |

* cited by examiner

*Primary Examiner* — Minnah L Seoh
*Assistant Examiner* — Marlon A Arce
(74) *Attorney, Agent, or Firm* — Sanders Pianowski LLP (57) ABSTRACT

A trailer coupler has a fixed frame portion that is connected to a moving frame portion with link arms. The link arms are attached to torsion components that are affixed to both the fixed frame portion and moving frame portion with the moving frame portion located between ends of the fixed frame portion. The moving frame portion has a resting position where the torsion components are at rest and a displaced position where external forces have caused the torsion components to move. The moving frame portion can be displaced through rotation or vertical movement by external forces.

20 Claims, 14 Drawing Sheets

TRUCK GOOSENECK FIFTH WHEEL TORSION HITCH

CROSS REFERENCE TO RELATED APPLICATIONS

This application claims the benefit of U.S. Provisional Application No. 63/018,943, filed May 1, 2020, the disclosures of which are hereby incorporated by reference.

BACKGROUND OF THE INVENTION

This present disclosure relates to hitch accessories that are connected to a towing vehicle, typically a heavy-duty pickup truck or flatbed truck. While being towed, a trailer introduces dynamic forces to a towing vehicle, which can be unsettling or dangerous, depending on the amount and direction of the force. The forces between the towing vehicle and trailer are commonly in the vertical (load-bearing) direction, with other forces either with or against the direction of travel. Some devices attempt to solve this problem by including a cushion to absorb vertical forces, but do nothing to absorb direction-of-travel forces. Others solve the issues with direction-of-travel forces but do nothing to absorb dynamic vertical forces. Therefore, an improved device that handles dynamic forces in multiple directions is needed.

SUMMARY OF THE INVENTION

The present disclosure describes a system for absorbing transient or dynamic forces between a towing vehicle and trailer. The invention is primarily used with a bed-mounted hitch, such as a fifth wheel or gooseneck. The torsion coupler has a fixed frame that is affixed to the vehicle, either through a bed-mounted rail system, puck system, or other mounting point that provides a secure and rigid connection to the towing vehicle's frame. A moving frame is coupled to the fixed frame through torsion components and torsion link arms. The moving frame is supported by the fixed frame and torsion components to move in response to forces exerted between the vehicle and trailer. The system described in this application can be used for pickup trucks, cab and chassis vehicles, flatbeds, semi tractor-trailers, class C motorhomes, semi tractors, and related vehicles. As opposed to other torsion-based suspension components, the orientation and location of the torsion components and geometry, vertical loading does not generate any inherent moment arm, offset loading, or torsion that transfers to either the trailer or the towing vehicle.

DESCRIPTION OF THE PREFERRED EMBODIMENT

Figure 1:
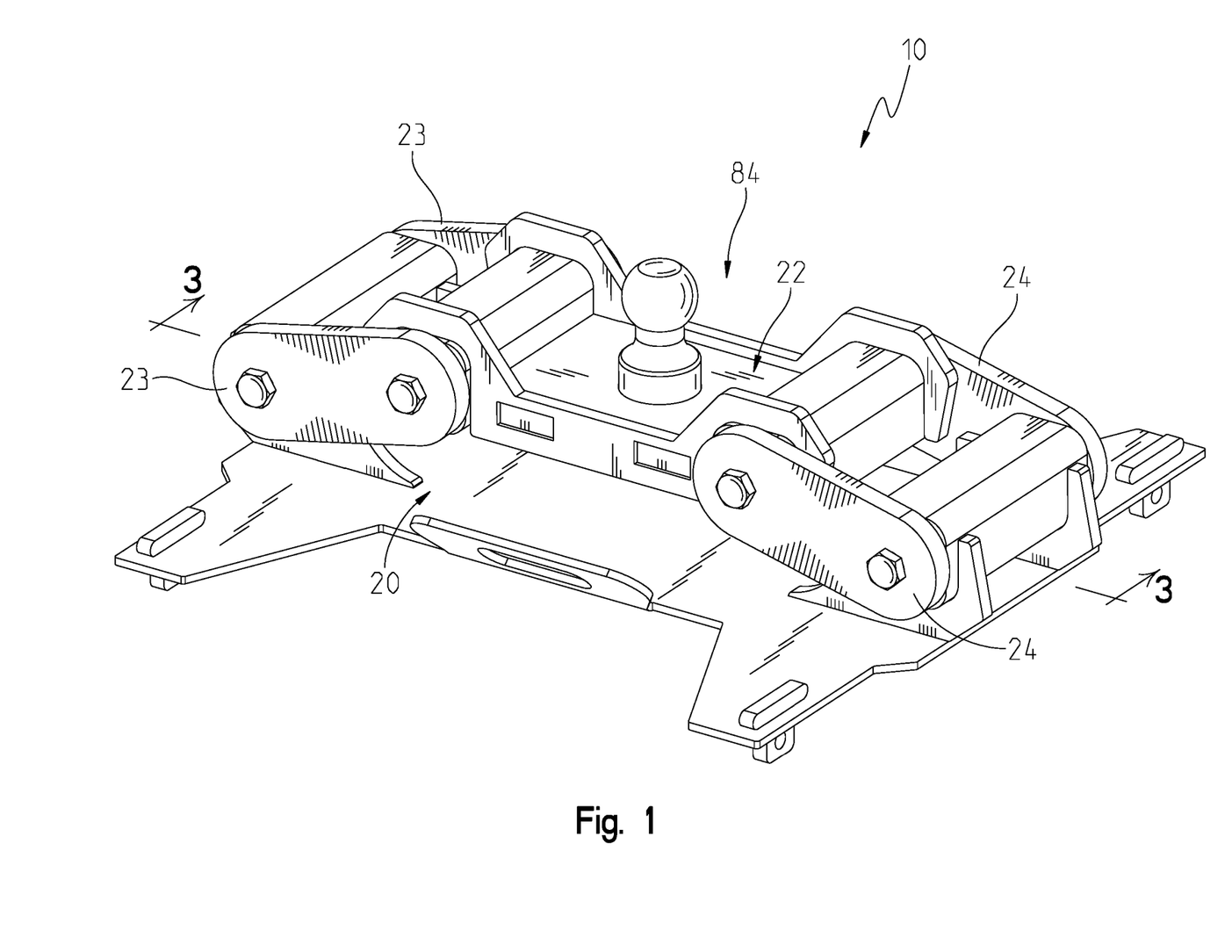
FIG. 1 is an isometric view of a gooseneck torsion coupler.
Figure 2:
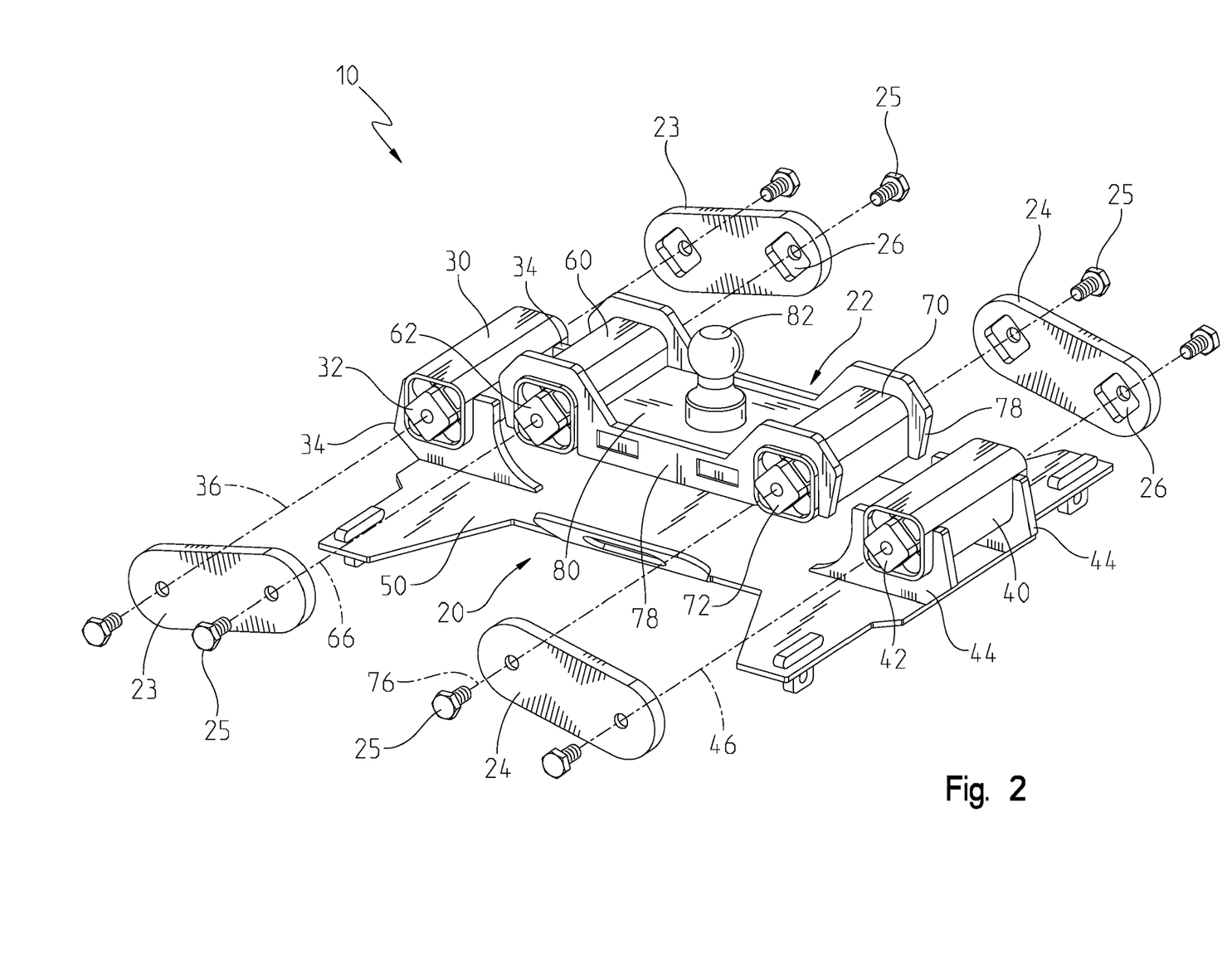
FIG. 2 is an exploded isometric view of the gooseneck torsion coupler in FIG. 1.
Figure 3:
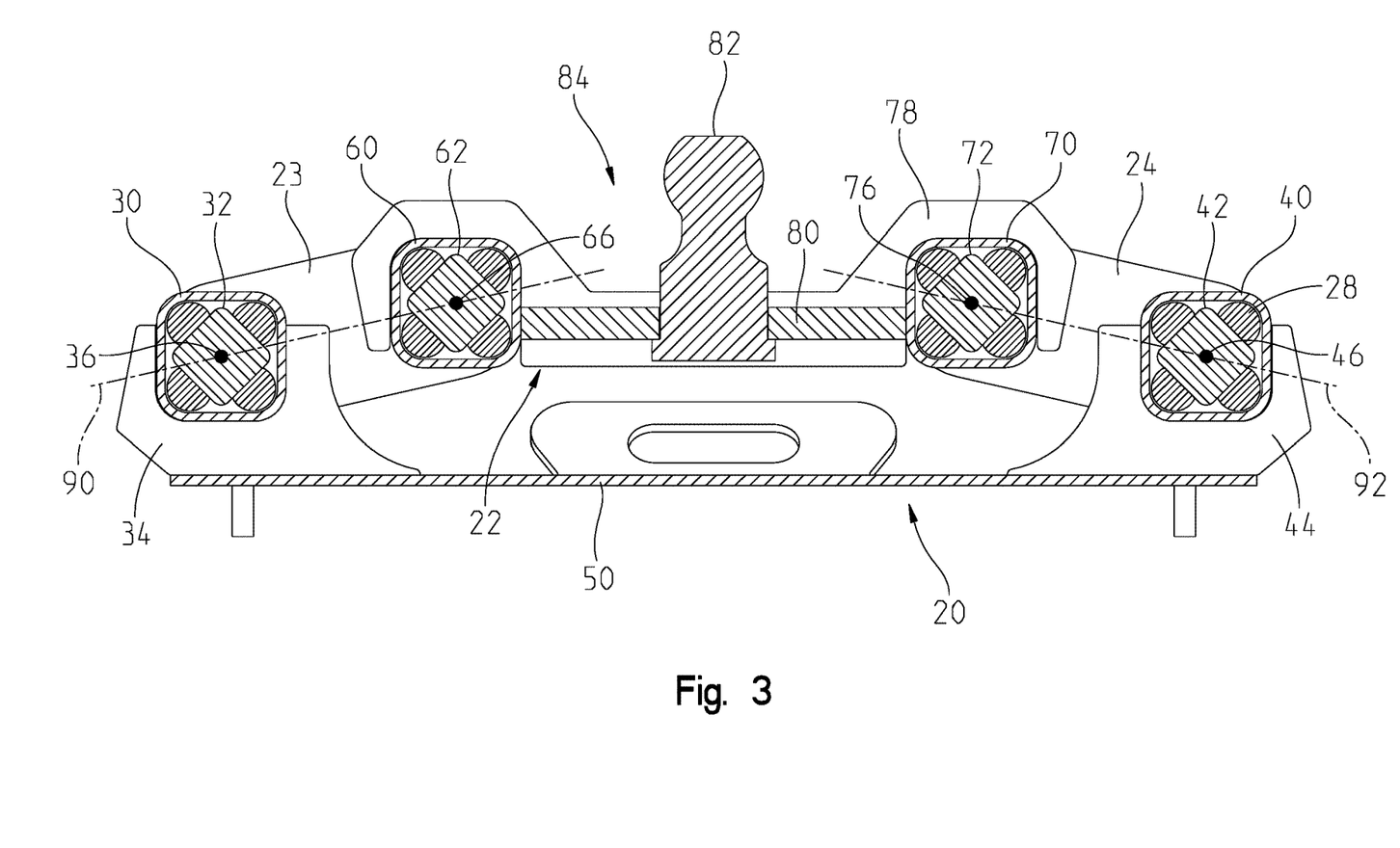
FIG. 3 is a section view 3-3 of the gooseneck torsion coupler in FIG. 1.
Figure 9A:
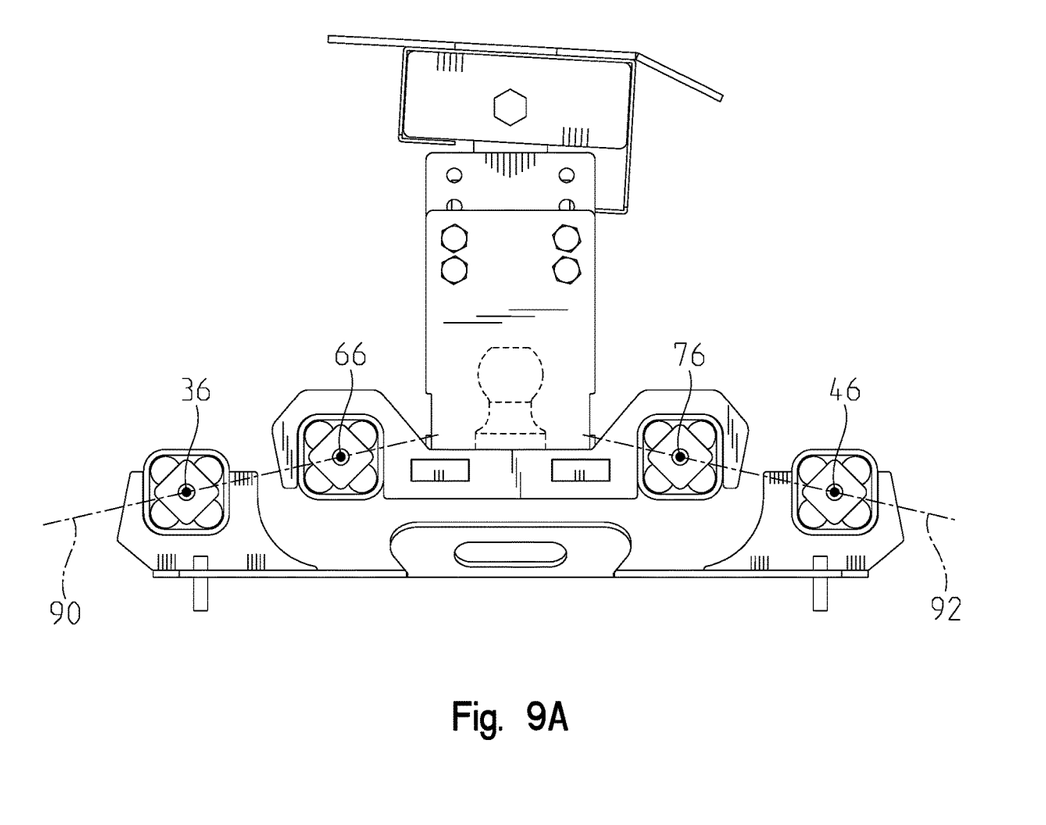
FIG. 9A is a side view of the coupler and fifth wheel adapter in the resting position.
Figure 9B:
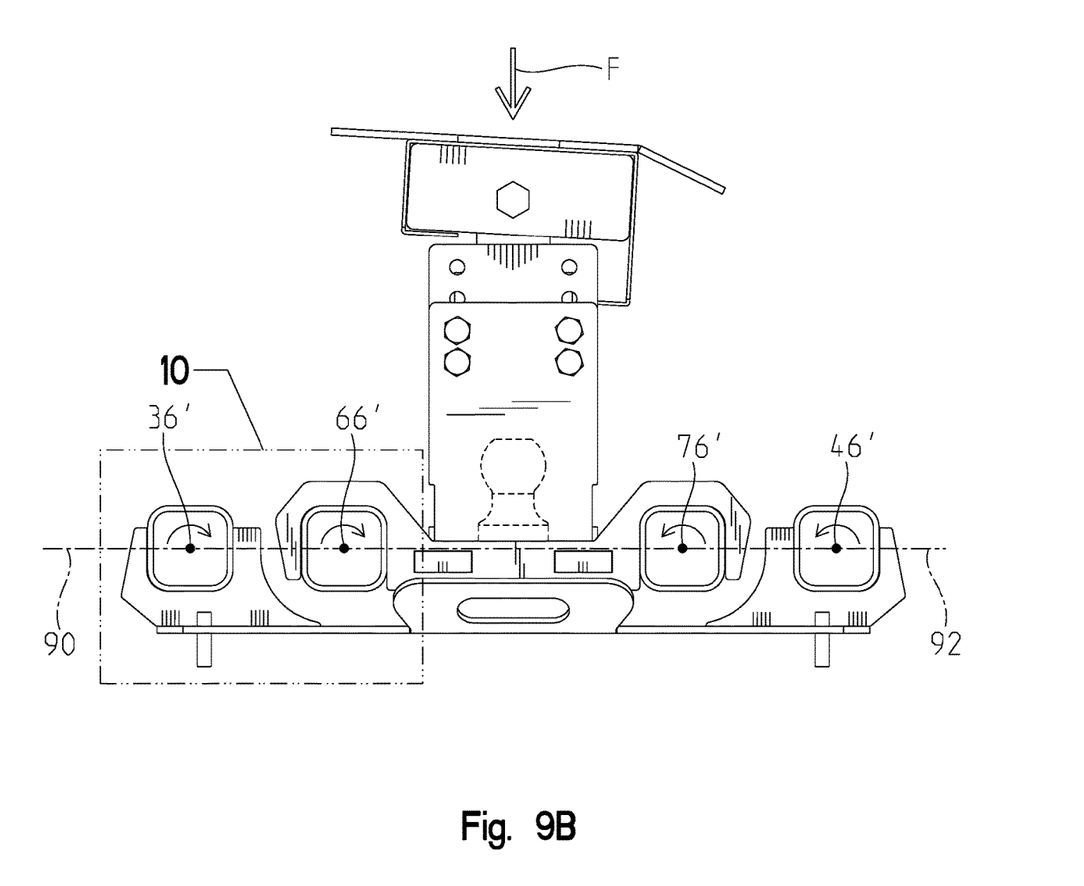
FIG. 9B is a side view of the coupler and fifth wheel adapter in the vertically loaded position.
Figure 9C:
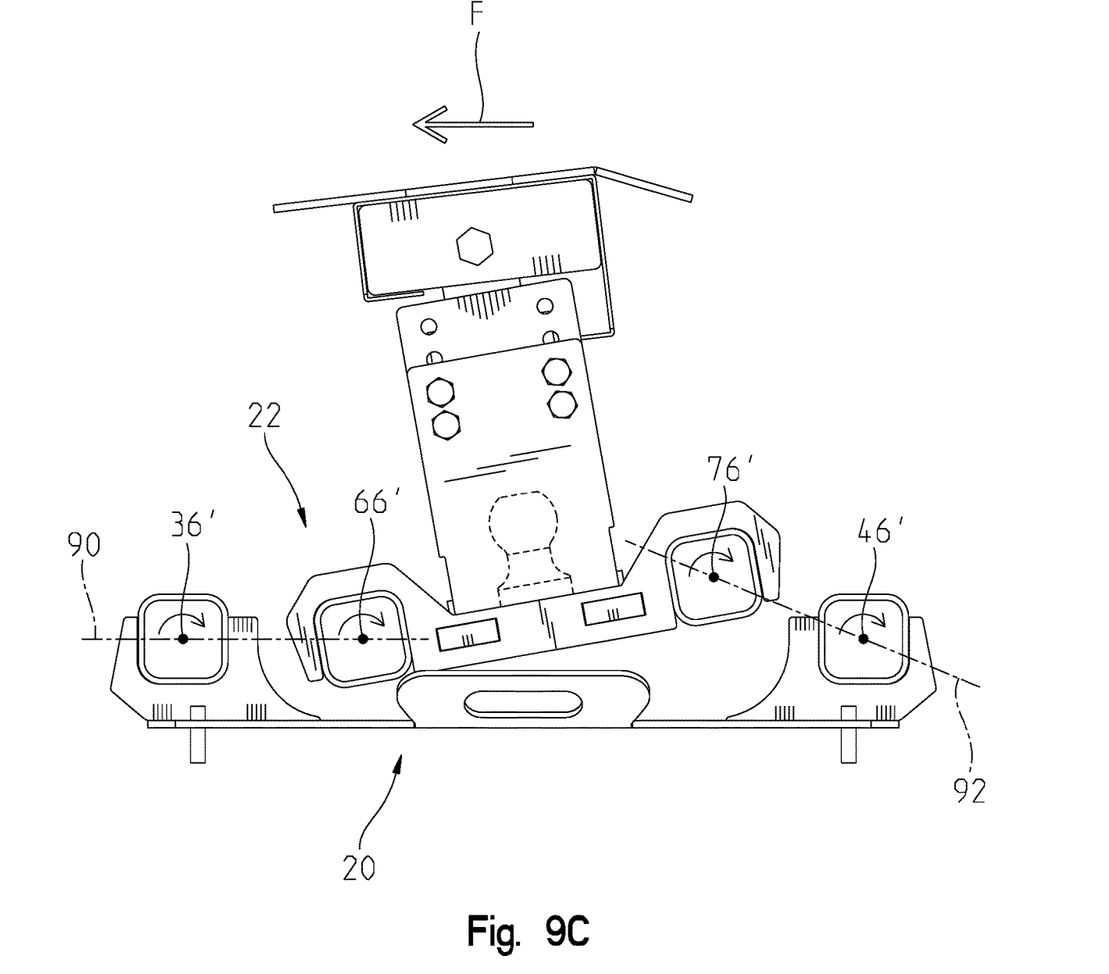
FIG. 9C is a side view of the coupler and fifth wheel adapter in the horizontally loaded position.

A torsion coupler 10 is shown in FIGS. 1-3 and with a fifth wheel adapter 12 in FIGS. 4-8. The coupler 10 has a fixed frame portion 20 and a moving frame portion 22. The portions 20, 22 are coupled with link arms 24, with the moving frame portion 22 suspended over the fixed frame portion 20. The only thing coupling the fixed frame portion 20 to the moving frame portion 22 are fore and aft link arms 23, 24. The moving frame portion 22 can move with respect to the fixed frame portion 20 between an unloaded or resting position, shown in FIG. 9A and different displaced positions, shown in FIGS. 9B and 9C. The displaced position shown in FIG. 9B is from force F in vertical direction. The displaced position shown in FIG. 9C is from force F in the direction of travel. While not shown, the moving frame portion 22 can be located in other positions, depending on the direction and intensity of force F. The fixed frame portion 20 is intended to be affixed to a towing vehicle (not shown). The fixed frame portion can be affixed to the towing vehicle using frame rails or to a truck bed rail system (not shown). It is contemplated that it is affixed using the towing vehicle's built-in puck system.

The fixed frame portion 20 has a fore torsion tube 30 and an aft torsion tube 40. The fore torsion tube 30 is located on the fore end of the fixed frame portion 20, and the aft torsion tube 40 is located on the aft end, which is opposite the fore end. The fore and aft torsion tubes (30, 40 respectively) are fixed with respect to each other with a series of components. The torsion tubes 30, 40 are held to a bottom plate 50 by tube supports 34, 44. The torsion tubes 30, 40 each carry respective rubber cords 28 that surround corresponding fore and aft torsion bars 32, 42. For all of the torsion tubes and torsion bars discussed herein, the rubber cords 28 urge each torsion bar to a neutral or resting position, shown in FIG. 3. In the resting position, each rubber cord 28 is applying pressure to the corresponding torsion bar to center it inside the torsion tube with the flats on the outside of the torsion bar at roughly 45 degree angle with respect to the flat inside surfaces on the inside of the torsion tube. The torsion bar can be displaced from the resting position by external forces, but the rubber cords 28 urge the torsion bar back towards the resting position. Torsion bars, rubber cords, and torsion tubes are commonly used for applications that benefit from a compact package that has a rotating component with spring resistance to movement with respect to a fixed component. These may also be referred to as torsion components with the torsion bar being a portion that is resiliently yieldable when torque is applied to it. As will be described herein, the use of torsion bars in this application extends beyond simple rotation. The torsion bars 32, 42 and rubber cords 28 are retained in their respective torsion tubes 30, 40. The torsion bars 32, 42, rubber cords 28, and torsion tubes 30, 40 are also referred to herein as outer torsion components. It is contemplated that the torsion tubes 30, 40 are affixed directly to the bottom plate 50 or otherwise fixed with respect to each other with the capability of being affixed to the towing vehicle. The designations of "fore" and "aft" used throughout the specification are merely for identification and do not specify a particular direction.

The moving frame portion 22 is held over the fixed frame portion 20 having a fore torsion tube 60 and an aft torsion tube 70. As with the torsion tubes on the fixed frame portion 20, the torsion tubes 60, 70 are located on opposite ends (fore and aft) of the moving frame portion 22. The torsion tubes 60, 70 are spaced from each other by a distance that is smaller than the distance between the torsion tubes 30, 40 on the fixed frame portion 20. The torsion tubes 60, 70 are located between the torsion tubes 30, 40 of the fixed frame portion. Each torsion tube 60, 70 carries rubber cords 28 surrounding and resiliently constraining corresponding fore and aft torsion bars 62, 72. The torsion bars 62, 72, rubber cords 28, and torsion tubes 60, 70 are also referred to herein as inner torsion components. The torsion tubes 60, 70 are fixed with respect to each other through a series of components, such as sides 78. The sides 78 and torsion tubes 60, 70 are affixed to a center plate 80 that carries a gooseneck ball 82.

In the fore direction, the torsion bar 32 is coupled to torsion bar 62 through fore link arms 23. In the aft direction, the torsion bar 42 is coupled to torsion bar 72 through aft link arms 24. The link arms 23, 24 have torsion bar pockets 26 that are sized to match the torsion bars. The pockets 26 transfer forces between the torsion bars and link arms without putting excessive strain on fasteners 25 that hold the link arms 23, 24 to their respective torsion bars.

The gooseneck ball 82 and sides 78 form a receiving channel 84 to retain the fifth wheel adapter 12.

Figure 4:
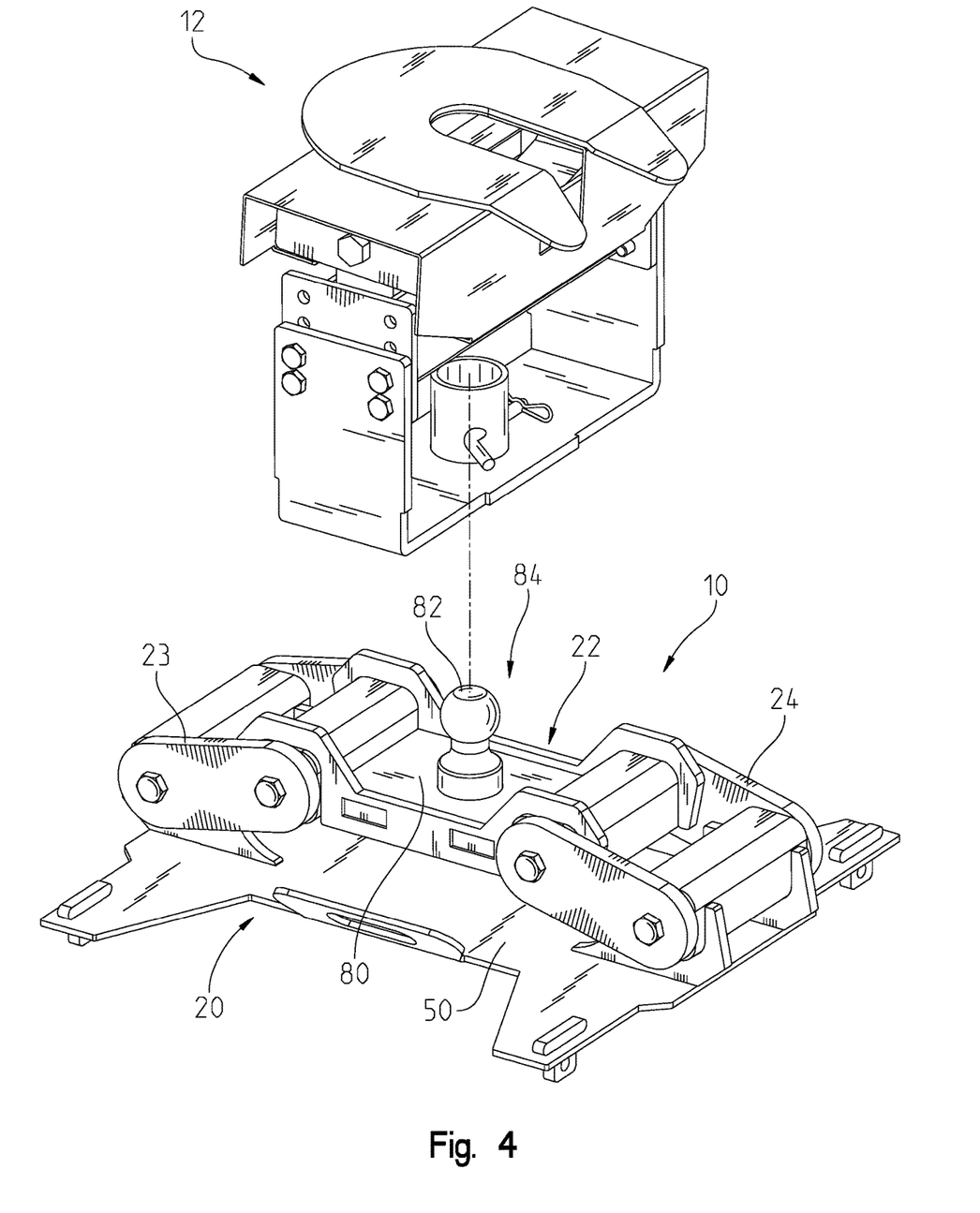
FIG. 4 is an isometric view of a fifth wheel adapter being installed on the gooseneck torsion coupler in FIG. 1.
Figure 5:
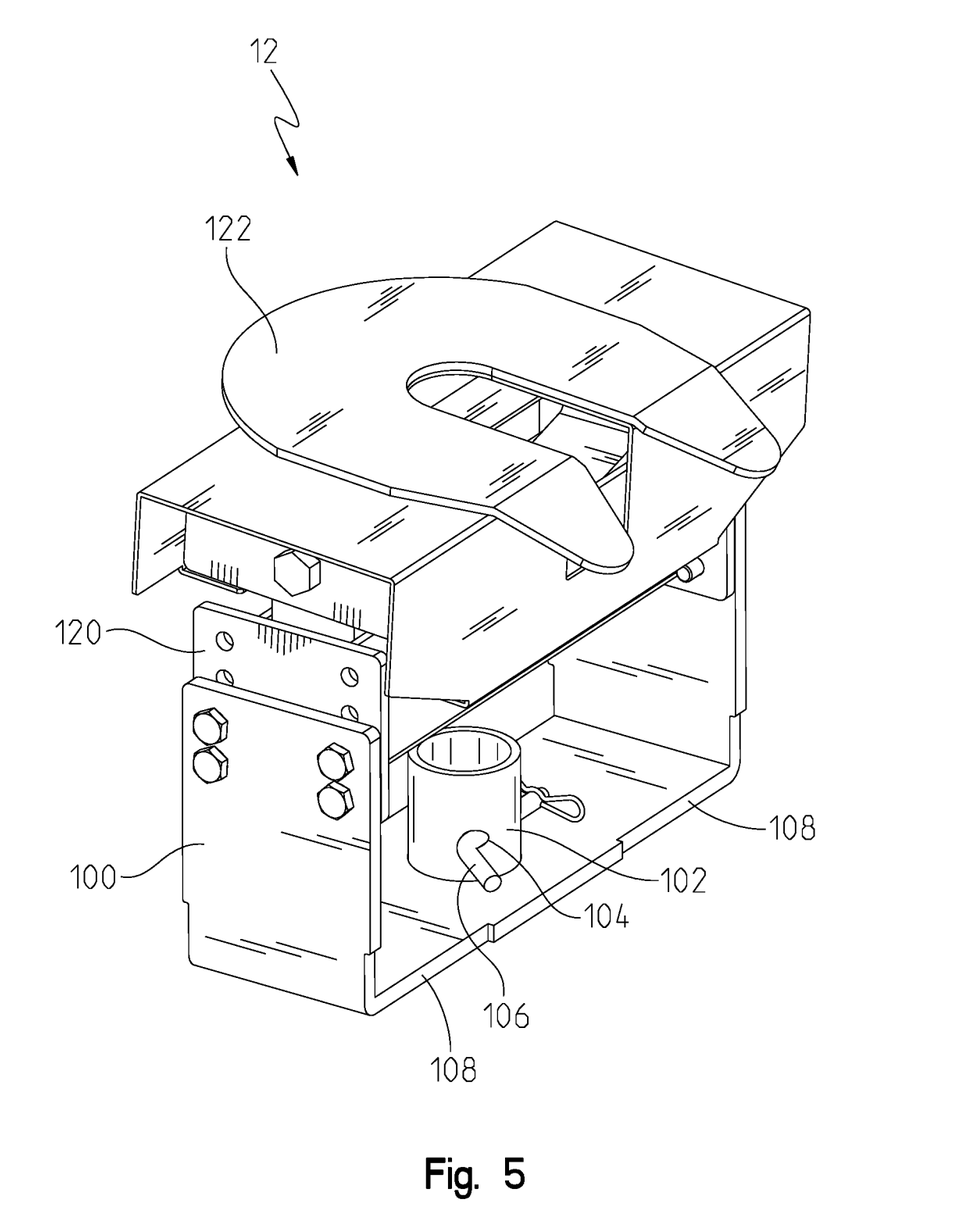
FIG. 5 is an isometric view of the fifth wheel adapter.
Figure 6:
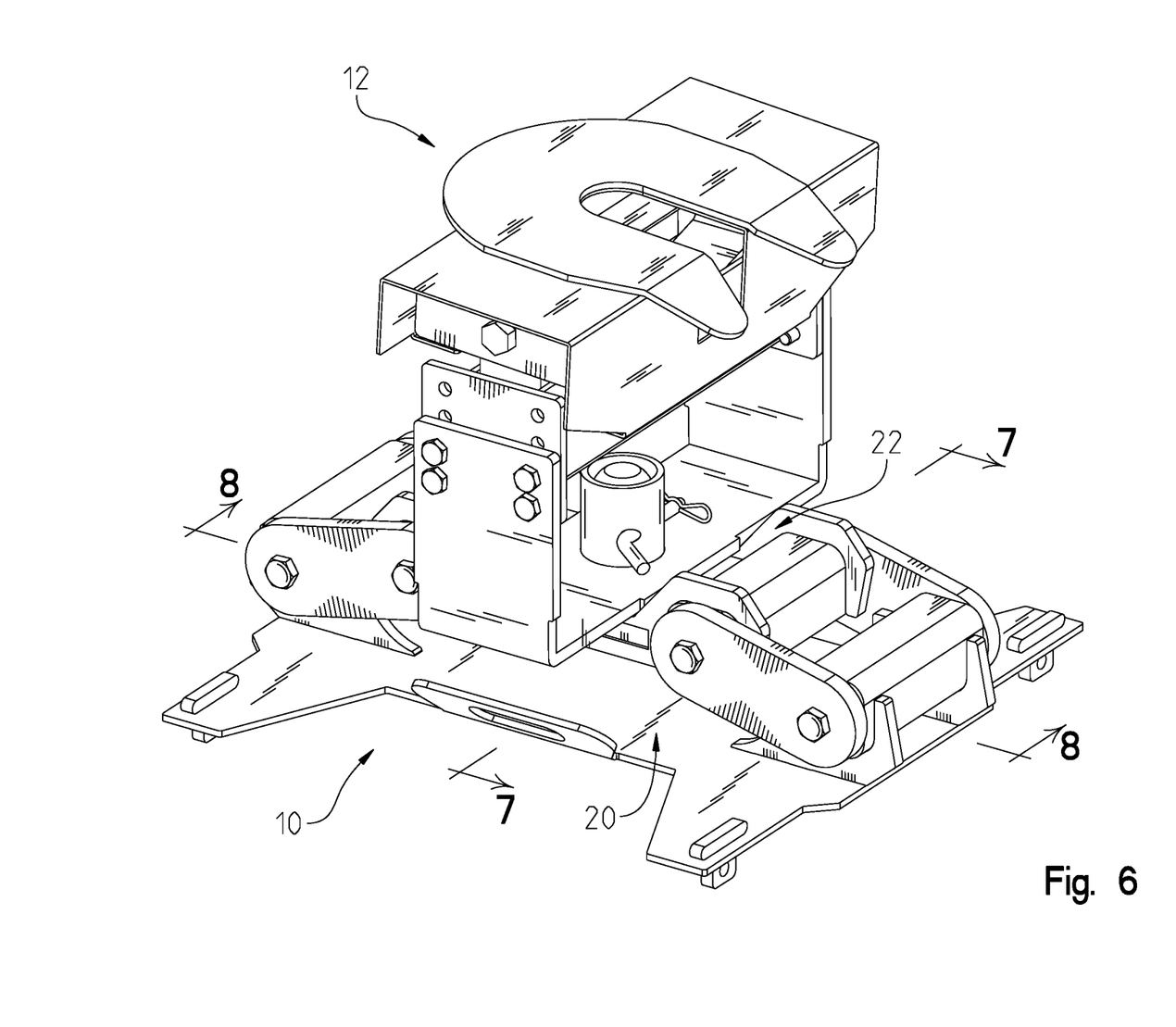
FIG. 6 is an isometric view of the gooseneck torsion coupler with the fifth wheel adapter attached.
Figure 7:
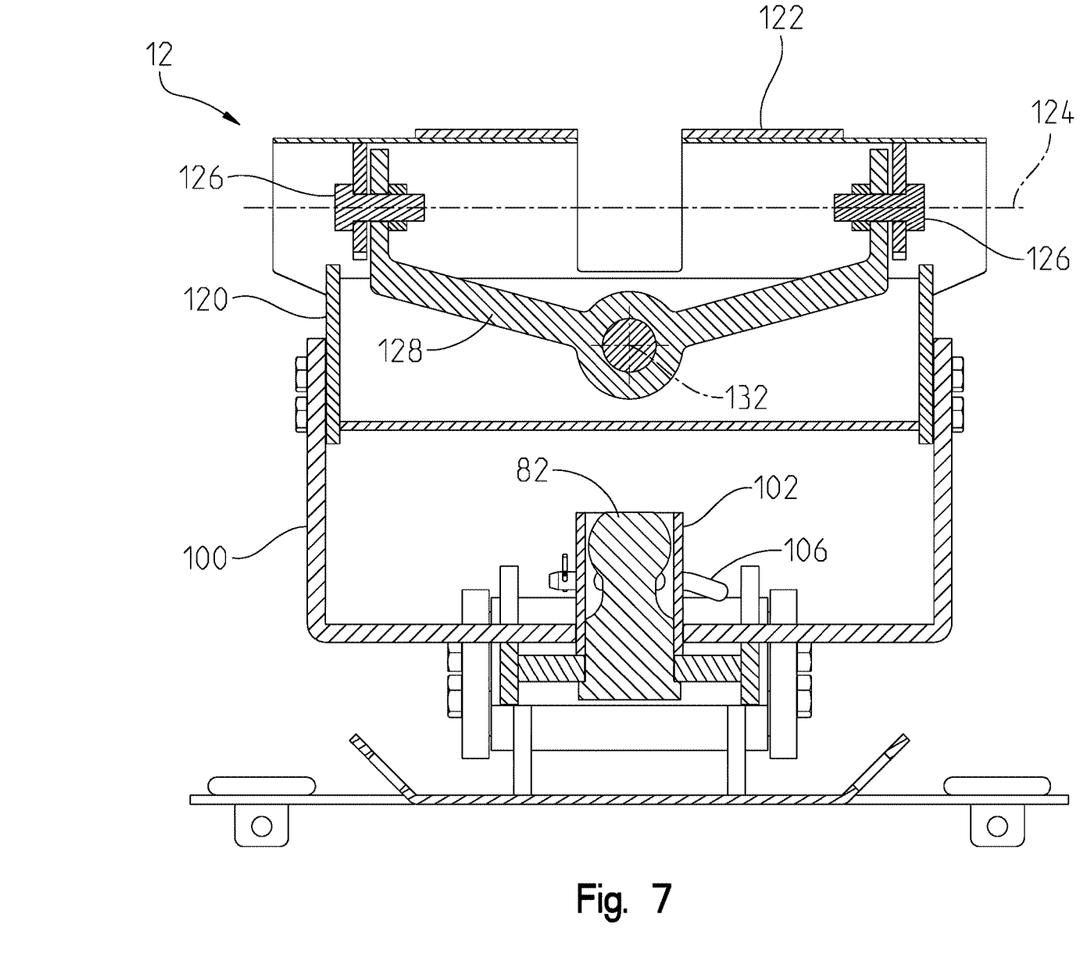
FIG. 7 is a section view 7-7 of the gooseneck torsion coupler and the fifth adapter in FIG. 6.
Figure 8:
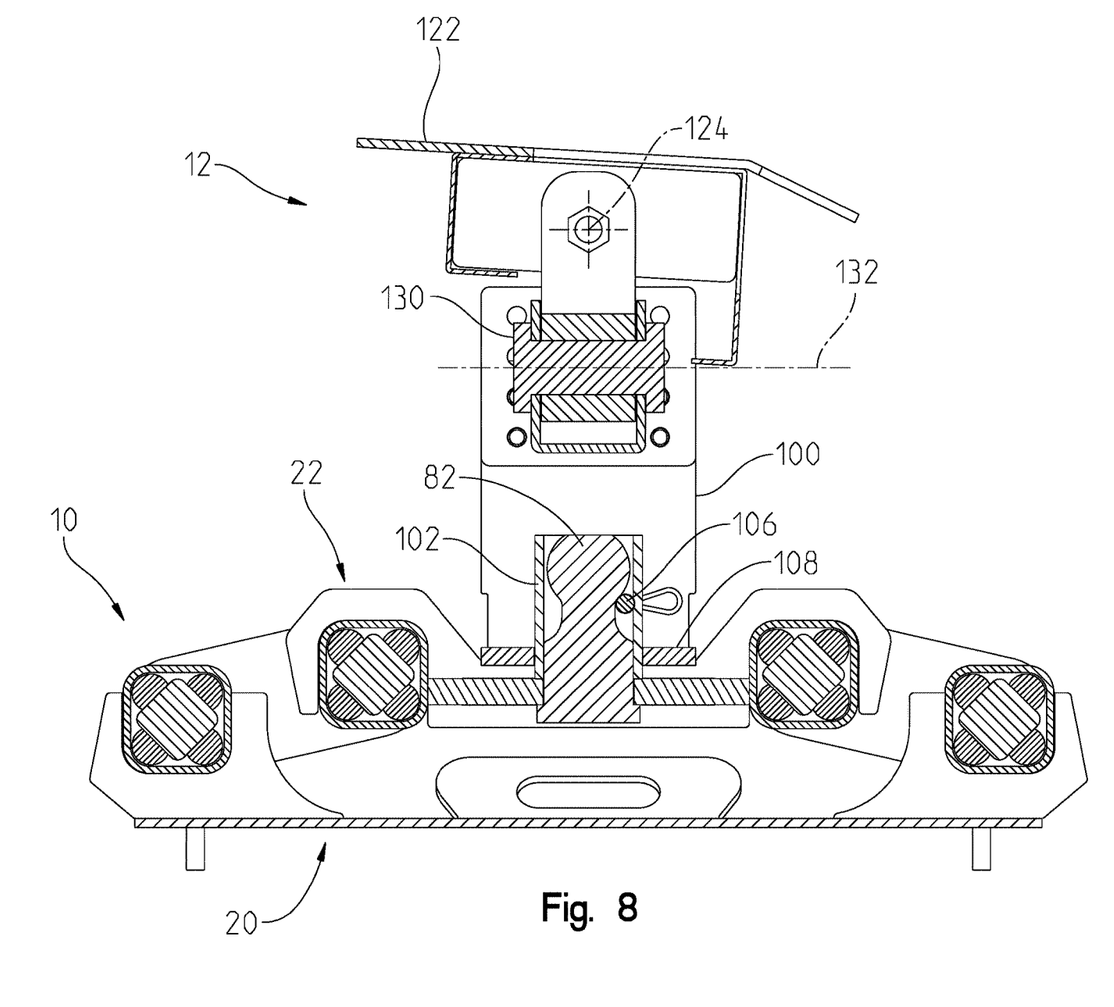
FIG. 8 is a side section view 8-8 of the gooseneck torsion coupler and the fifth adapter in FIG. 6.

The fifth wheel adapter 12 has a lower frame 100 with a tube 102 that fits over the gooseneck ball 82. The tube 102 has a transverse hole 104 that receives a pin 106 to capture the ball 82. The lower frame 100 is sized to be located in the receiving channel 84, as shown in FIG. 4, with edges 108 that can contact the sides 78 to prevent rotation between the coupler 10 and the adapter 12. The upper frame 120 carries a common fifth-wheel attachment setup, and can be affixed to the lower frame 100 at different elevations. The adapter 12 allows limited rotation of the top plate 122 with respect to the upper frame 120 about two axes. The adapter 12 is shown without the internal latch/catch mechanism as part of the top plate 122, but a latch/catch mechanism is contemplated. A pitch axis 124 is formed by pins 126 that couple the top plate 122 to a wishbone frame 128. The wishbone frame 128 is attached to the upper frame 120 by a pin 130, which allows the wishbone frame 128 limited rotation about a roll axis 132.

Figure 11:
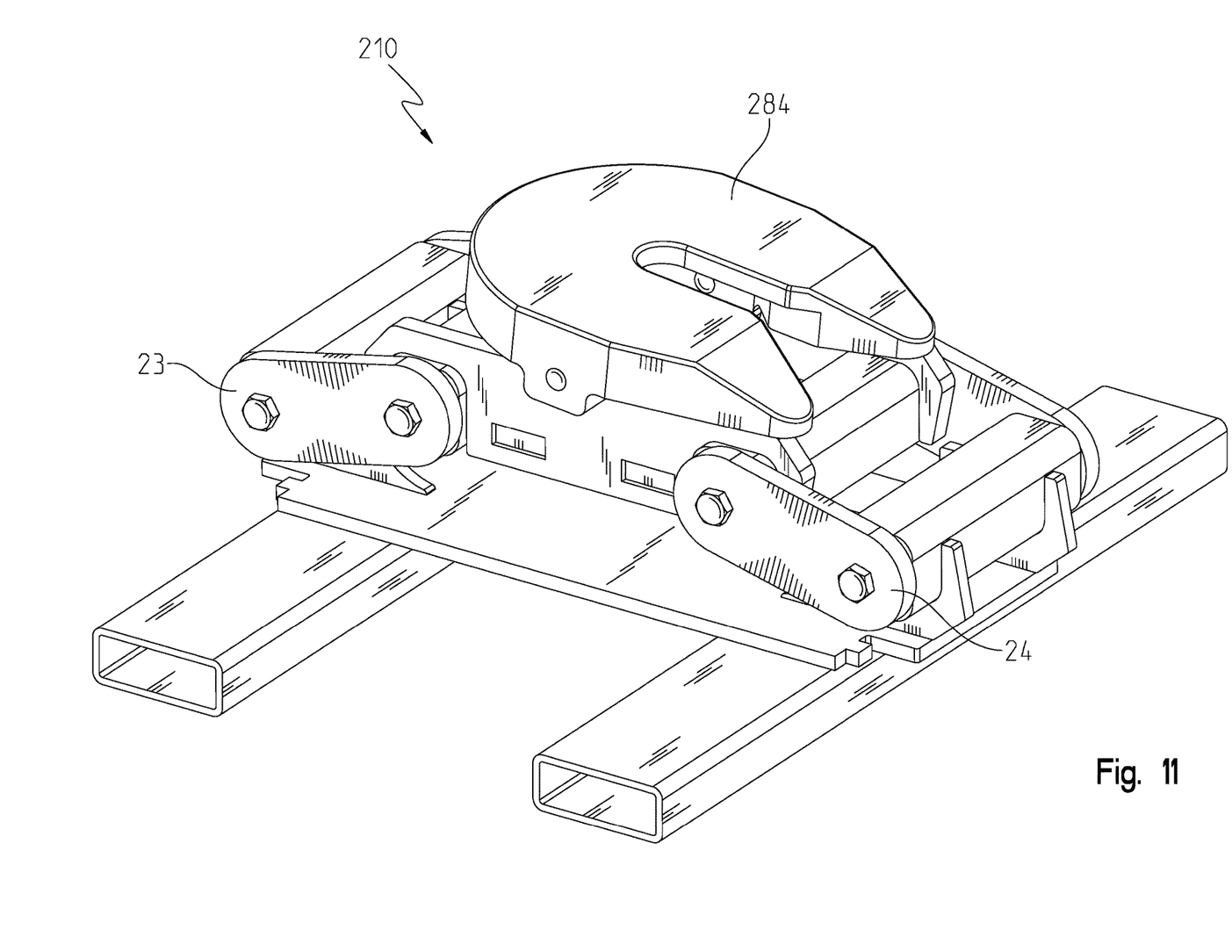
FIG. 11 is an isometric view of a fifth wheel coupler.
Figure 12:
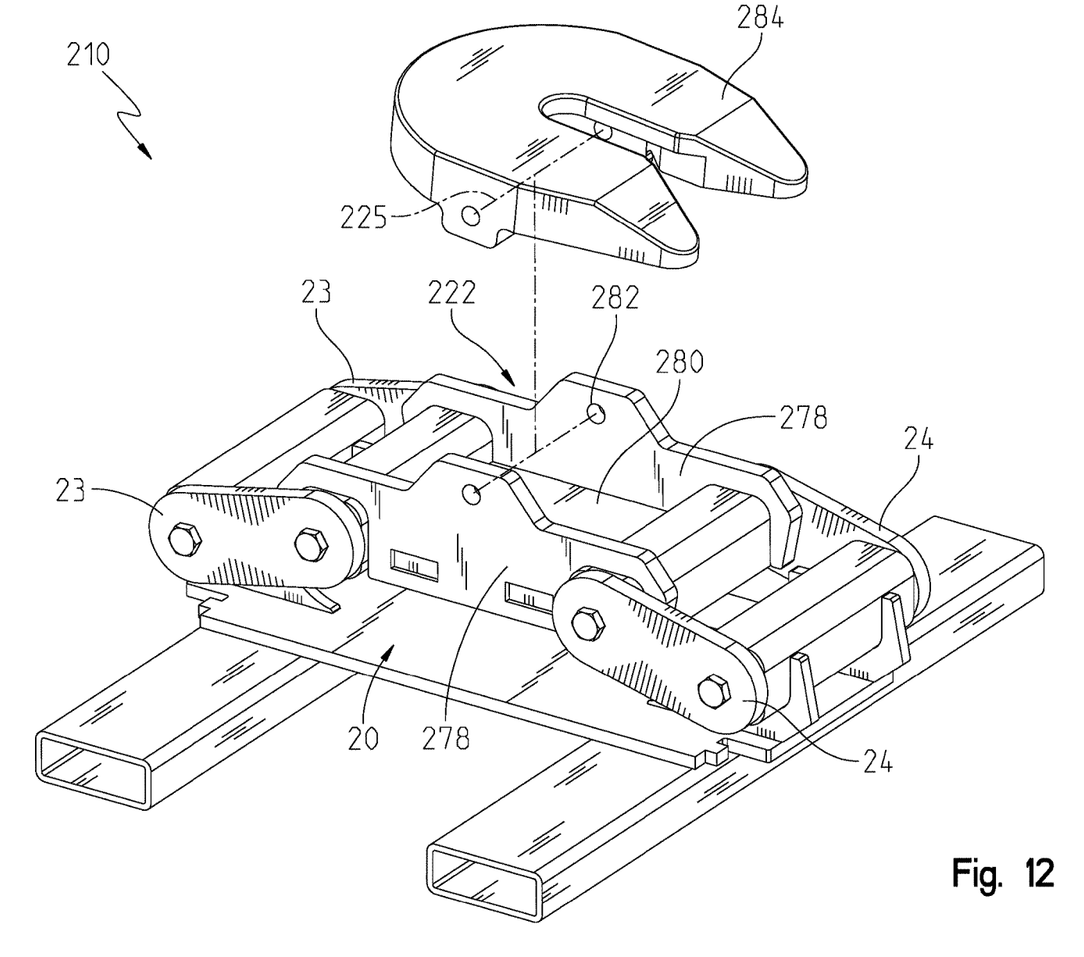
FIG. 12 is a partially exploded isometric view of the fifth wheel coupler in FIG. 11.

The coupler 10 can be used in heavy duty semi-tractor applications, such as the coupler 210 shown in FIGS. 11-12. The coupler 210 shares the same main portions, such as the fixed frame portion 20 and a moving frame portion 222 set up to receive a top plate 284. The fixed frame portion 20 is designed to be affixed to the frame rails of a semi-tractor (not shown). The moving frame portion 222 has a center plate 280 and sides 278 that include pivot mounts 282. The pivot mounts 282 allow the top plate 284 to be secured to the moving frame portion 222. As opposed to the coupler 10 and fifth wheel adapter 12, the top plate 284 only can rotate about a pitch axis 225 with respect to the moving frame portion 222.

The geometry of the torsion bars, torsion tubes, and rubber cords cooperate to form a torsion component where the torsion bar has a resting position (shown in FIGS. 1-4, 6-8, and 9A) and a displaced position where the torsion bar is rotated or otherwise displaced within the torsion tube (shown in FIGS. 9B and 9C). The rubber cords 28 urge their corresponding torsion bar towards the resting position.

The gooseneck ball 82, top plate 122, and top plate 284 are all considered trailer connection points. Trailer connections points are the mating points between the trailer (not shown) and the coupler 10, 210. While not shown, other types of interfaces between the trailer and coupler are contemplated.

Figure 10:
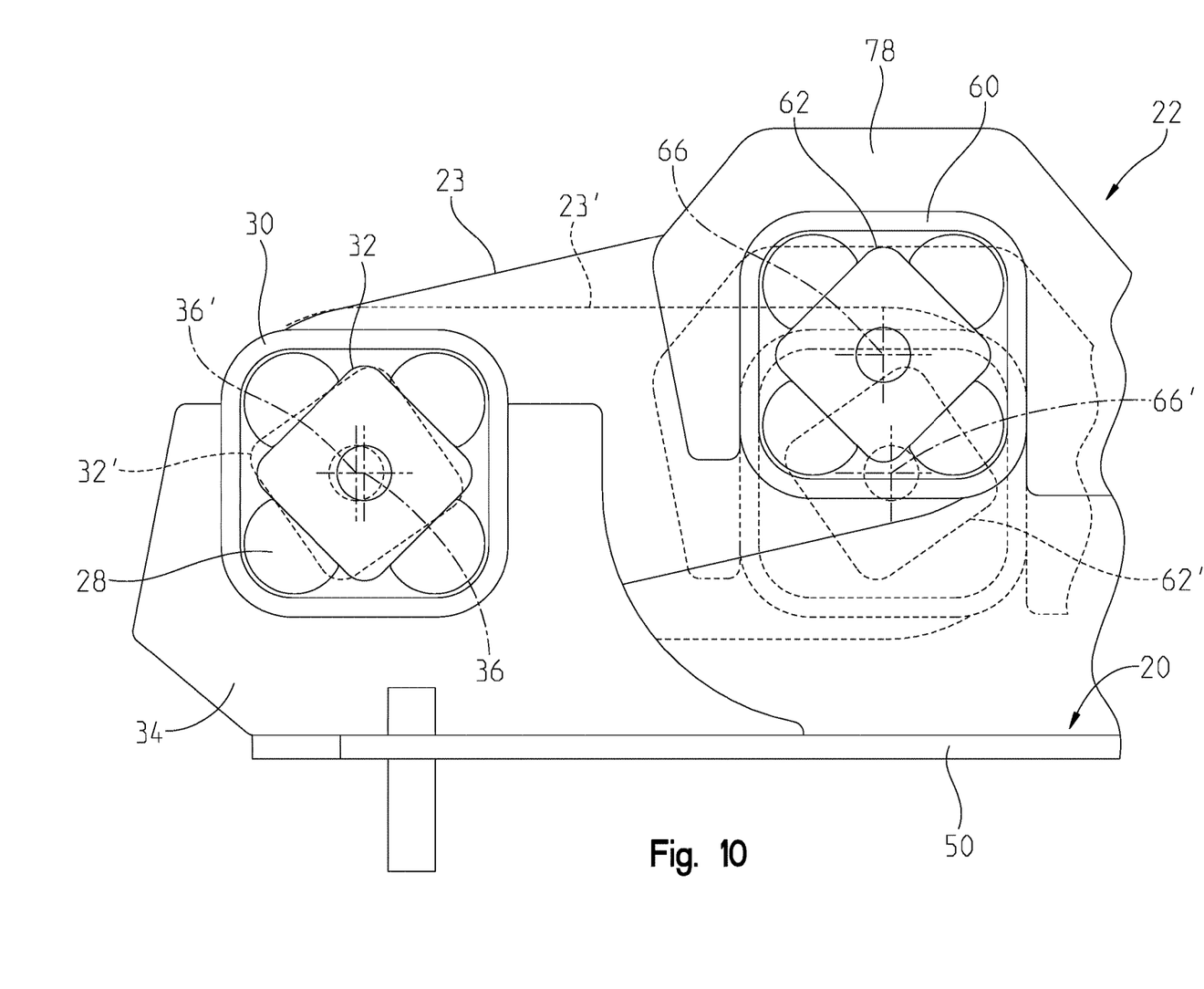
FIG. 10 is partial view 10 of the coupler in the unloaded and loaded position in FIGS. 9A and 9B.

In use, the moving frame portion 22 has a resting position that corresponds with the resting position of the torsion bars 32, 42, 62, 72. This position places the moving frame portion 22 away from the fixed frame portion 20, shown as the unloaded position in FIG. 9A. Once the trailer is connected to the gooseneck ball 82, either directly or through the fifth wheel adapter 12, the weight of the trailer moves the moving frame portion 22 closer to the fixed frame portion, shown as the loaded position in FIG. 9B. The downward force of the trailer puts the link arms in compression and causes some degree of radial movement of the torsion bars within the torsion tubes from their unloaded/resting position, as well as some rotational movement. The movement of the torsion bars with the force F as shown in FIG. 9B applied is shown in partial view FIG. 10 with only the fore portion shown to show details. The aft portion moves the same but in the opposite direction. In other words, the radial movement of the torsion bars within the torsion tubes moves their central axes (36, 66) to displaced axes of rotation (36', 66') that is offset from the center of their corresponding torsion tube. The movement of components is shown in dashed lines and labeled with prime such as when the central axis 36 of torsion bar 32 becomes 36' in the displaced position. The link arm 23 is shown as broken lines in the displaced position to cut down on confusion and additional lines, while still showing the movement of the axes 36 and 66. In the displaced position, the moving frame portion 22 is closer to the fixed frame portion 20. A fore plane 90 intersects axes 36 and 66, with a corresponding aft plane 92 intersecting axes 46 and 76. In other words, axis 36 is a fore outer central axis, 66 is a fore inner central axis, 76 is an aft inner central axis, and 46 is an aft outer central axis. The fore plane 90 passes through the fore inner and outer central axes 36, 66. The aft plane 92 passes through the aft inner and outer central axes 76, 46. In the unloaded position, the fore plane 90 is at an angle with respect to the aft plane 92. In the resting or unloaded position shown in FIG. 9A, the planes 90, 92 intersect each other. The angle of these planes 90, 92 change with respect to each other, as is shown in FIGS. 9B and 9C. For example, the planes 90, 92 can become aligned with each other at the loaded position shown in in FIG. 9B. The point of intersection of the planes 90, 92 in FIG. 9C is different than the intersection in FIG. 9A. While not shown, it is possible to apply force F to the moving frame portion 22 to move it where the planes 90, 92 are parallel and do not intersect. The relationship of the planes 90, 92 is in contrast to many other torsion setups where link arms and planes would remain parallel throughout the travel of the moving portion.

The compression of the rubber cords by the radial movement, in addition to the resistance of the torsion bars to rotation, combines to amplify the amount of resistance to vertical movement of the moving frame portion 22.

In the acceleration/deceleration position, which is shown exaggerated to show movement of the components, force F is in the direction of travel. In this position, one set of torsion bars is rotated much more than the other set, as shown in FIG. 9C, with the possibility of the other set being rotated in the opposite direction.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A trailer coupler for being affixed to a towing vehicle and for attaching a trailer to said towing vehicle, said coupler comprising:
    a fixed frame portion having a fore torsion tube affixed thereto on one end and an aft torsion tube affixed thereto on an opposite end, said fore torsion tube retaining a fore torsion bar, said aft torsion tube retaining an aft torsion bar;
    a moving frame portion having a fore torsion tube affixed thereto and an aft torsion tube affixed thereto, said fore torsion tube retaining a fore torsion bar, said aft torsion tube retaining an aft torsion bar, said moving frame portion having a trailer connection point affixed thereto;
    said torsion tubes of said fixed frame portion spaced from each other by a distance greater than a distance between said torsion tubes of said moving frame portion, each said torsion bar resiliently held inside its corresponding torsion tube by resilient cords; and
    fore link arms connecting said fore torsion bar of said fixed frame portion to said fore torsion bar of said moving frame portion, aft link arms connecting said aft torsion bar of said fixed frame portion to said aft torsion bar of said moving frame portion.

2. The trailer coupler in claim 1, where said fore and aft torsion tubes of said moving frame portion are located between said fore and aft torsion tubes of said fixed frame portion.

3. The trailer coupler in claim 1, wherein said trailer connection point is a gooseneck ball affixed thereto.

4. The trailer coupler in claim 1, wherein said moving frame has a receiving channel and a gooseneck ball located in said receiving channel.

5. The trailer coupler in claim 4, further comprising a fifth wheel adapter affixed to said gooseneck ball, said fifth wheel adapter having a lower frame located in said receiving channel and having a tube to receive and affix to said gooseneck ball, said fifth wheel adapter having an upper frame affixed to said lower frame, said upper frame having a wishbone frame pivotally affixed thereto, said wishbone frame having a top plate pivotally affixed thereto, said top plate is said trailer connection point.

6. The trailer coupler in claim 1, each said fore torsion bar is rotatable about a central axis, a fore plane intersects said central axes of said fore torsion bars, each said aft torsion bar is rotatable about a central axis, an aft plane intersects said central axes of said aft torsion bars, said fore plane intersects said aft plane when said moving frame portion is in a resting position.

7. The trailer coupler in claim 6, said fore and aft planes having an angular position with respect to each other, said angular position changing as force is placed on said moving frame portion.

8. The trailer coupler in claim 6, wherein said moving frame portion is movable with respect to said fixed frame portion between said resting position and a loaded position, the intersection of said fore plane and said aft plane moves when said moving frame portion moves from said resting position.

9. A trailer coupler for being affixed to a towing vehicle, said coupler comprising:
    a fixed frame portion having a fore outer torsion component affixed thereto and an aft outer torsion component affixed thereto, each said outer torsion component having a portion that is resiliently yieldable under torque;
    a moving frame portion having a fore inner torsion component affixed thereto and an aft inner torsion component affixed thereto, each said inner torsion component having a portion that is resiliently yieldable under torque;
    said fore and aft outer torsion components of said fixed frame portion spaced from each other by a distance greater than a distance between said fore and aft inner torsion components of said moving frame portion, said resiliently yieldable portion of said fore inner torsion component affixed to said resiliently yieldable portion of said fore outer torsion component by fore link arms, said resiliently yieldable portion of said aft inner torsion component affixed to said resiliently yieldable portion of said aft outer torsion component by aft link arms; and
    said moving frame portion is movable with respect to said fixed frame portion from a rest position to a displaced position.

10. The trailer coupler in claim 9, wherein said rest position is defined by no external forces being applied to said moving frame portion, said displaced position is defined by external forces being applied to said moving frame portion that moves said moving frame from said rest position.

11. The trailer coupler in claim 9, wherein each said resiliently yieldable portion has a corresponding central axis, a fore plane intersecting said central axes of said fore inner torsion component and said fore outer torsion component, an aft plane intersecting said central axes of said aft inner torsion component and said aft outer torsion component, said fore and aft planes intersecting when said moving frame portion is in said rest position.

12. The trailer coupler in claim 11, wherein said fore plane intersects said aft plane at a first angle when said moving frame portion is in said rest position and a second angle when said moving frame portion is in said displaced position.

13. The trailer coupler in claim 9, wherein said outer torsion components comprising a fore torsion tube and an aft torsion tube, said fore torsion tube retaining a fore torsion bar, said aft torsion tube retaining an aft torsion bar, said inner torsion components comprising a fore torsion tube and an aft torsion tube, said fore torsion tube retaining a fore torsion bar, said aft torsion tube retaining an aft torsion bar, each said torsion bar resiliently held inside its corresponding torsion tube by resilient cords.

14. The trailer coupler in claim 13, wherein said link arms affixed to terminal ends of each of said torsion bars to couple said moving frame portion to said fixed frame portion.

15. A trailer coupler for being affixed to a towing vehicle, said coupler comprising:
    a fixed frame portion having a fore outer torsion component affixed thereto and an aft outer torsion component affixed thereto;

a moving frame portion having a fore inner torsion component affixed thereto and an aft inner torsion component affixed thereto;

each said torsion component having a portion that is resiliently yieldable under force;

said fore and aft outer torsion components of said fixed frame portion spaced from each other by a distance greater than a distance between said fore and aft inner torsion components of said moving frame portion, said resiliently yieldable portion of said fore inner torsion component affixed to said resiliently yieldable portion of said fore outer torsion component by fore link aims, said resiliently yieldable portion of said aft inner torsion component affixed to said resiliently yieldable portion of said aft outer torsion component by aft link arms; and said moving frame portion is movable with respect to said fixed frame portion from a rest position to a displaced position.

16. The trailer coupler in claim 15, wherein said displaced position is defined by at least one resiliently yieldable portion yielding from an external force applied to said moving frame portion.

17. The trailer coupler in claim 15, wherein said rest position is defined by no external forces being applied to said moving frame portion, said displaced position is defined by external forces being applied to said moving frame portion that moves said moving frame from said rest position.

18. The trailer coupler in claim 15, wherein each said resiliently yieldable portion has a central axis, a fore plane intersecting said central axes of said fore inner torsion component and said fore outer torsion component, an aft plane intersecting said central axes of said aft inner torsion component and said aft outer torsion component, said fore and aft planes intersecting when said moving frame portion is in said rest position.

19. The trailer coupler in claim 18, wherein said fore plane intersects said aft plane at a first angle when said moving frame portion is in said rest position and a second angle when said moving frame portion is in said displaced position.

20. The trailer coupler in claim 15, wherein said outer torsion components comprising a fore torsion tube and an aft torsion tube, said fore torsion tube retaining a fore torsion bar, said aft torsion tube retaining an aft torsion bar, said inner torsion components comprising a fore torsion tube and an aft torsion tube, said fore torsion tube retaining a fore torsion bar, said aft torsion tube retaining an aft torsion bar, each said torsion bar resiliently held inside its corresponding torsion tube by resilient cords, said link arms affixed to terminal ends of each of said torsion bars to couple said moving frame portion to said fixed frame portion.

\* \* \* \* \*